(12) United States Patent
Bilmes et al.

(10) Patent No.: US 6,546,784 B2
(45) Date of Patent: Apr. 15, 2003

(54) LASER APPARATUS FOR MEASURING DIRT DENSITY ON STEEL PLATES

(75) Inventors: Gabriel Mario Bilmes, Buenos Aires (AR); Oscar Eduardo Martinez, Buenos Aires (AR)

(73) Assignees: Consejo Nacional de Investigaciones Cientificas y Tecnicas (CONICET) (AR); Fundacion Para el Desarrollo Tecnologico (FUDETEC) (AR)

( * ) Notice: Subject to any disclaimer, the term of this patent is extended or adjusted under 35 U.S.C. 154(b) by 129 days.

(21) Appl. No.: 09/811,500

(22) Filed: Mar. 20, 2001

(65) Prior Publication Data

US 2001/0037671 A1 Nov. 8, 2001

(51) Int. Cl.$^7$ ................................................ G01N 9/00
(52) U.S. Cl. ...................... 73/32 A; 73/587; 219/121.83
(58) Field of Search .............................. 73/32 A, 587, 73/596, 643; 134/1; 204/157.15; 219/121.83

(56) References Cited

U.S. PATENT DOCUMENTS

| 4,255,971 A | * | 3/1981 | Rosencwaig | .................. 73/643 |
| 4,898,650 A | * | 2/1990 | Wu et al. | .............. 204/157.15 |
| 5,045,669 A | * | 9/1991 | Ortiz et al. | ............ 219/121.83 |

* cited by examiner

Primary Examiner—John E. Chapman
(74) Attorney, Agent, or Firm—Fitzpatrick, Cella, Harper & Scinto

(57) ABSTRACT

The invention is an apparatus that measures dirt density on steel plates, characterized by including a pulsed laser that impinges on the inspected plate, and a microphone that detects the sound produced by the sudden ablation of the dirt, the amplitude of the microphone signal being the measure of the dirt on the plate. The microphone is connected to an electronic signal processing system, which is a computer or a programmed digital processor that determines the average value and standard deviation of the signal over the number of hits specified by the operator.

4 Claims, 1 Drawing Sheet

LASER APPARATUS FOR MEASURING DIRT DENSITY ON STEEL PLATES

The invention described below is about an apparatus for the measurement of dirt density on steel plates, that can be used in the plate manufacturing industry, in the manufacture of appliances and in any other manufacturing process involving steel plates, in which the degree of cleanliness of the plate is relevant.

The existing alternative methods to determine the dirt density on the surface of rolled steel plate are based on laboratory procedures carried out on plate samples. The most common one consists in sampling the dirt by means of a transparent adhesive tape. When the tape is placed in contact with the plate, the dirt (or part of it) sticks to the tape, modifying its optical transparency, which is subsequently measured at the lab. Alternative techniques are based on the quantitative analysis of the dirt removed by solvent extraction or by incineration and subsequent determination of the carbon residues.

None of the existing techniques allows the measurement of dirt in real time (i.e., at the time the dirt is sampled) and, much less, with the plate in motion.

The apparatus described below has the advantage of allowing the measurement during the final stages of plate inspection, and of providing a dirt density profile along the plate, and not only at points where the plate is sampled. Being an entirely automatic measurement, it is less subject to measurement errors originating from a manual operator.

The apparatus described is capable of measuring the density of the dirt that is present on the surface of rolled steel plate. Such measurements may be carried out directly on a moving plate, or on stationary samples. The apparatus consists of a pulsed laser, the optical devices to aim the laser beam at the plate to be measured, an acoustic detector (microphone) and the associated electronics for signal processing and control.

The operating principle is based on the fact that the surface dirt is constituted by a film of grease or oil and particles of different compounds. If a laser pulse of sufficient energy per beam cross sectional area and short duration (~10 nanoseconds) impinges on the plate, a sudden reheating and evaporation of the dirt is produced. During this process called "ablation" particles are ejected along with oil and other residual fluids. Various phenomena are produced as a consequence of the interaction between the laser pulse and the film on the plate surface. One of them is the emission of a crisp sound, the intensity of which is a function of the amount of dirt present. This intensity is adopted as a measurement of the ejected dirt, which increases with the dirt density present on the plate. For this purpose, a microphone connected to a signal processing system is placed at an adequate distance from the point where the laser hits the plate. The signal processing scheme required is the determination of the amplitude of the acoustic signal.

Figure 1:
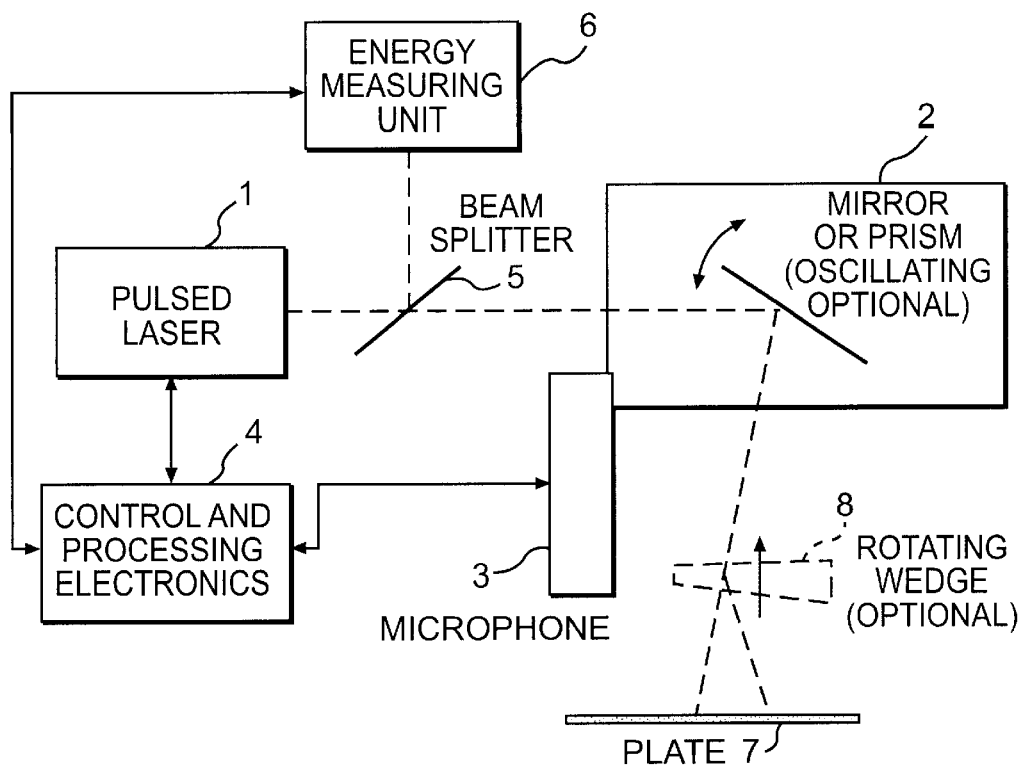
Figure 2:
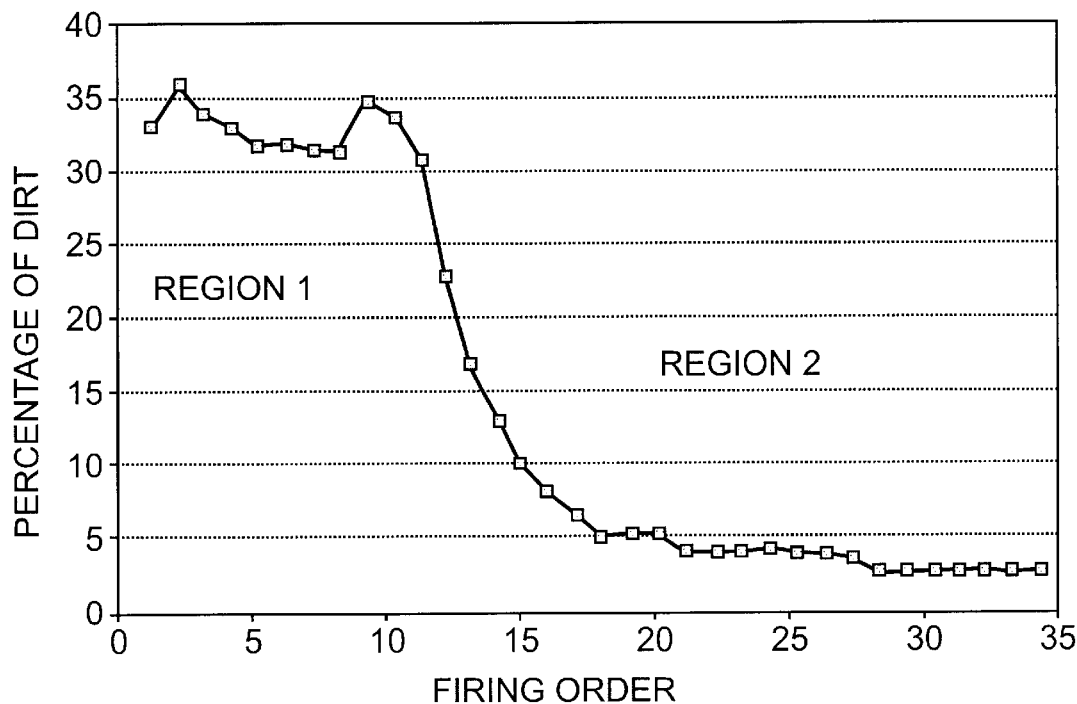

The apparatus described is sketched in FIG. 1, whereas FIG. 2 shows the percentage of dirt measured as a function of the firing order (see below).

The pulsed laser is indicated in FIG. 1 by the box labeled (1). The laser pulse is aimed in (2) and hits the plate (7), which may be stationary or moving. A microphone (3) detects the acoustic signal associated to the ablation of dirt. The control and processing electronics (4) is essentially either a personal computer or programmable microprocessor, and a signal acquisition unit. A beam splitter (5) and an energy measuring unit (6) are also included. If the plate (7) is moving, the optical aiming device may be fixed, whereas if the plate is stationary, the beam has to be deflected to different plate points, to avoid hitting the same place more than once. The pulse energy has to be high enough to produce the ablation of the dirt film, but not enough to damage the plate. The relative motion of beam and plate makes it possible to sample the amount of dirt at neighboring points, yielding not only an average value, but also its standard deviation. This is an additional piece of information that may be used to determine the homogeneity of dirt in the scanned area. If the plate is in motion, the aiming optics (2) may be stationary or nonexistent. If the plate is stationary, the location of the impact point should move, either as a result of an oscillating mirror or prism (2), or with the beam describing a cone surface as a result of a rotating transparent wedge (8).

The microphone (3) located at a given distance from the point where the laser hits the plate picks up the sound intensity which provides the dirt level after a calibration process. Because the sound intensity is a function of the beam geometry and the pulse energy, a reference sample is used to standardize the measurement results. The microphone location is, however, not critical, and is typically 10 to 30 centimeters away from the plate surface, on the side of the incident laser. Directional microphones may be located at larger distances, and if the distance between plate and microphone has only small fluctuations, this distance may be quite small.

FIG. 2 shows a measurement of the percentage of dirt for a succession of hits. During the first 11 hits the plate was displaced continuously, so that each time a different position on the plate was hit. The variations in the measured signal shown in the region labeled I are due to fluctuations in the surface dirt along the plate. Subsequent hits on the stationary plate are shown to clean the plate surface, until the corresponding measured value is stabilized at the value corresponding to a clean plate (region labeled 2).

It is possible to measure along the plate the average value of the dirt density profile, and other statistical parameters, such as the standard deviation. For this reason, the apparatus includes an adequately programmed computer or microprocessor.

Measurements carried out on rolled plate samples showed that, above a detection threshold, there is a linear response of the acoustic signal with the pulse energy until the plate melting threshold is reached. Within that range, a comfortable working point may be found away from both thresholds. Fluctuations in the pulse energy may be corrected with the help of a beam splitter (5) that is used to sample the pulse, and an electronic energy measurement device (6), which may be typically a piezoelectric or pyroelectric detector, a thermocouple assembly or a photodiode.

The acquisition and processing electronics is standard for measuring peaks of electronic signals. Peak or peak-to-peak detectors, or a signal digitizing system and subsequent data processing may be used.

The specific tested prototype was built with a Neodymium-YAG laser with pulses of 20 nanoseconds and energies between 20 and 200 millijoules, with a wavelength of 1064 nanometers. Similar results were obtained with the emission of the second harmonic of the same laser at the wavelength of 532 nanometers. The microphone used was of the electret type. The signal was acquired with a digital oscilloscope and processed on a standard personal computer. The sampling rate of the laser was 2 Hz, but there is no limiting factor on this, except for the fact that the plate or the beam should move fast enough to avoid the overlap of two consecutive pulses on the plate.

If the plate is in motion, the aiming optics (2) may be stationary or nonexistent. If the plate is stationary, the location of the impact point should move, either as a result of an oscillating mirror or prism, or with the beam describing a cone surface as a result of a rotating transparent wedge.

What is claimed is:

1. An apparatus to measure dirt density on steel plates, which includes a pulsed laser that impinges on the plate under inspection, a microphone that detects the sound produced by the sudden ablation of the dirt, the amplitude of the microphone signal being the measure of the dirt density on the plate, the microphone is connected to an electronic data processing system composed of a computer or programmed digital processor that determines the average value and standard deviation of the signal over a number of pulses specified by the operator.

2. An apparatus such as specified in claim 1, characterized by using a pulsed Neodymium-YAG laser emitting on a 1064 nanometer wavelength and an electret microphone.

3. An apparatus such as specified in claim 1, characterized by incorporating a mirror or prism that oscillates and deviates the laser beam, moving the point of impact on the plate in such a way that, with a stationary plate, the points of impact are non-overlapping.

4. An apparatus such as specified in claim 1, characterized by incorporating a rotating transparent wedge traversed by the laser in such a way that its impacts describe a circle on the plate and do not overlap each other.

* * * * *